United States Patent
Naoi et al.

(10) Patent No.: US 10,133,414 B2
(45) Date of Patent: Nov. 20, 2018

(54) LAYERED BODY FOR TOUCH PANEL, AND TOUCH PANEL

(71) Applicant: FUJIFILM Corporation, Tokyo (JP)

(72) Inventors: Kenji Naoi, Kanagawa (JP); Toshiaki Hayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/988,231

(22) Filed: Jan. 5, 2016

(65) Prior Publication Data

US 2016/0132183 A1 May 12, 2016

Related U.S. Application Data

(63) Continuation of application No. PCT/JP2014/067536, filed on Jul. 1, 2014.

(30) Foreign Application Priority Data

Jul. 17, 2013 (JP) .................................. 2013-148364

(51) Int. Cl.
*G06F 3/041* (2006.01)
*B32B 15/02* (2006.01)
(Continued)

(52) U.S. Cl.
CPC .............. *G06F 3/0418* (2013.01); *B32B 7/12* (2013.01); *B32B 15/02* (2013.01); *G06F 3/044* (2013.01);
(Continued)

(58) Field of Classification Search
CPC ..... B32B 7/12; B32B 15/02; B32B 2457/208; G06F 3/044; G06F 3/0418; G06F 2203/04103; G06F 2203/04112
See application file for complete search history.

(56) References Cited

U.S. PATENT DOCUMENTS

2012/0183769 A1 7/2012 Nasu et al.
2015/0008014 A1* 1/2015 Zhou ....................... G06F 3/044
174/251
(Continued)

FOREIGN PATENT DOCUMENTS

CN 101577148 A 11/2009
CN 102482546 A 5/2012
(Continued)

OTHER PUBLICATIONS

Notification of Transmittal of Translation of the International Preliminary Report on Patentability and Translation of Written Opinion of the International Searching Authority; PCT/JP2014/067536 dated Jan. 28, 2016.
(Continued)

*Primary Examiner* — Christopher E Leiby
(74) *Attorney, Agent, or Firm* — Studebaker & Brackett PC

(57) ABSTRACT

The invention provides a layered body for a touch panel in which metal migration is suppressed and changes in the electrical resistance of a fine metal wire are suppressed, and a touch panel. The layered body for a touch panel of the invention is a layered body for a touch panel including a substrate, fine metal wires which are disposed on the substrate, and an adhesive layer which is disposed on the fine metal wires, in which the amount of the metal contained per unit area in the fine metal wire is in a range of 0.01 g/m² to 10 g/m², the adhesive layer contains a benzotriazole-based compound, and the content of the benzotriazole-based compound is in a range of 0.05 mass % to 1.5 mass % with respect to the total mass of the adhesive layer.

11 Claims, 2 Drawing Sheets

(51) Int. Cl.
    *G06F 3/044*           (2006.01)
    *B32B 7/12*             (2006.01)

(52) U.S. Cl.
    CPC ............... *B32B 2457/208* (2013.01); *G06F 2203/04103* (2013.01); *G06F 2203/04112* (2013.01)

(56) References Cited

U.S. PATENT DOCUMENTS

2015/0364713 A1* 12/2015 Takeda .................. H01L 51/445
                                                                       257/40
2015/0376477 A1* 12/2015 Katami .................. G06F 3/0414
                                                                       345/173

FOREIGN PATENT DOCUMENTS

| JP | 2009-146678 A | 7/2009 |
|----|---------------|--------|
| JP | 2012-077281 A | 4/2012 |

OTHER PUBLICATIONS

International Search Report, PCT/JP2014/067536, dated Sep. 16, 2014.

TW Office Action dated Sep. 15, 2017, from corresponding TW Appl No. 103123380, with English translation, 7 pp.

An Office Action issued by the Chinese Patent Office (SIPO) dated Nov. 16, 2017, which corresponds to Chinese Patent Application No. 201480038579.9 and is related to U.S. Appl. No. 14/988,231; with English language translation.

An Office Action issued by Taiwanese Patent Office dated Apr. 18, 2018, which corresponds to Taiwanese Patent Application No. 103123380 and is related to U.S. Appl. No. 14/988,231 with English language translation.

\* cited by examiner

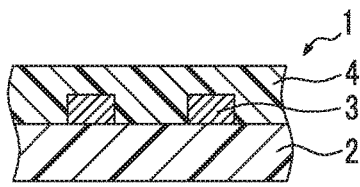
FIG. 1
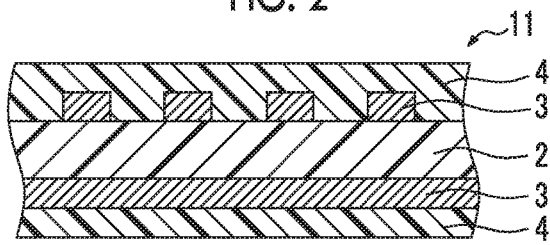
FIG. 2
FIG. 3
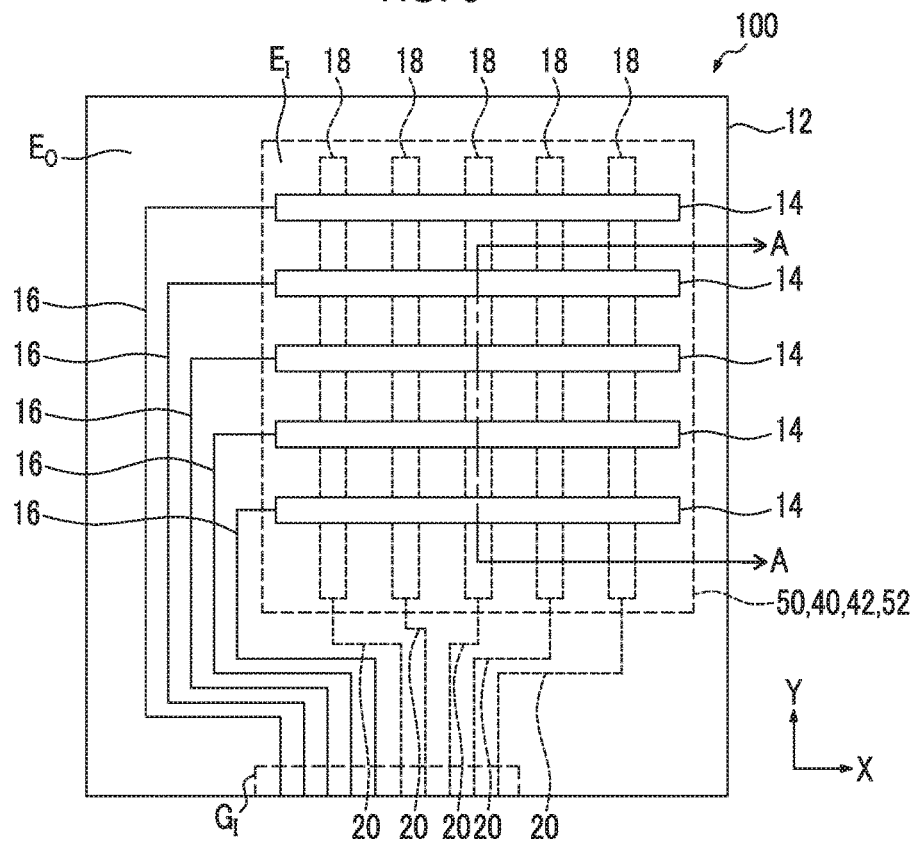

LAYERED BODY FOR TOUCH PANEL, AND TOUCH PANEL

CROSS-REFERENCE TO RELATED APPLICATIONS

This application is a Continuation of PCT International Application No. PCT/JP2014/067536 filed on Jul. 1, 2014, which claims priority under 35 U.S.C. § 119(a) to Japanese Patent Application No. 2013-148364 filed on Jul. 17, 2013. The above application is hereby expressly incorporated by reference, in its entirety, into the present application.

BACKGROUND OF THE INVENTION

1. Field of the Invention

The present invention relates to a layered body for a touch panel and a touch panel.

2. Description of the Related Art

Conductive films having fine metal wires formed on a substrate have been widely used in transparent electrodes of various electronic devices such as solar cells, inorganic EL elements, and organic EL elements, electromagnetic shields of various display devices, touch panels, transparent planar heating elements, and the like. Particularly, the ratio of touch panels mounted on cell phones, portable game machines, and the like has increased in recent years, and a demand for conductive films for an electrostatic capacitive touch panel capable of performing multipoint detection has burgeoned.

Silver and copper can be exemplified as a metal contained in a fine metal wire in a conductive film, but these have a problem in that ion migration easily occurs. When such ion migration occurs between fine metal wires, conduction between fine metal wires or disconnection of a fine metal wire occurs, and thus a circuit function is not performed.

JP2012-77281A discloses an aspect in which an adhesive layer containing 5-methyl-1H-benzotriazole is formed on a conductive film as a method of inhibiting the ion migration.

SUMMARY OF THE INVENTION

The inventors have conducted a study on the aspect of JP2012-77281A, and have found that in a region in which fine metal wires are thinned, the occurrence of metal migration, an increase in the electrical resistance of a fine metal wire, and the like are confirmed, and thus a predetermined effect may not always be obtained.

The invention is contrived in view of the circumstances, and an object thereof is to provide a layered body for a touch panel in which metal migration is suppressed and changes in the electrical resistance of a fine metal wire are suppressed.

The inventors have conducted an intensive study on the problem of the related art, and have found that a desired effect can be obtained by controlling each of the metal amount in a fine metal wire and the amount of the benzotriazole used in the adhesive layer within a predetermined range, respectively.

That is, the inventors have found that the problem can be solved with the following configurations.

(1) A layered body for a touch panel, including a substrate, fine metal wires which are disposed on the substrate, and an adhesive layer which is disposed on the fine metal wires, in which the amount of the metal contained per unit area in the fine metal wire is in a range of 0.010 g/m$^2$ to 10 g/m$^2$, the adhesive layer contains a benzotriazole-based compound, and the content of the benzotriazole-based compound is in a range of 0.05 mass % to 1.5 mass % with respect to the total mass of the adhesive layer.

(2) The layered body for a touch panel according to (1), in which the adhesive contained in the adhesive layer does not substantially contain a carboxyl group.

(3) The layered body for a touch panel according to (1) or (2), in which the benzotriazole-based compound includes 1,2,3-benzotriazole.

(4) The layered body for a touch panel according to any one of (1) to (3), in which the fine metal wires are fine metal wires obtained by performing an exposure treatment on a silver halide-containing silver salt emulsion layer disposed on the substrate, and by performing a developing treatment thereafter.

(5) A touch panel including the layered body for a touch panel according to any one of (1) to (4).

According to the invention, it is possible to provide a layered body for a touch panel in which metal migration is suppressed and changes in the electrical resistance of a fine metal wire are suppressed.

BRIEF DESCRIPTION OF THE DRAWINGS

FIG. 1 is a schematic cross-sectional view of a preferred embodiment of a layered body for a touch panel of the invention.

FIG. 2 is a schematic cross-sectional view of another preferred embodiment of the layered body for a touch panel of the invention.

FIG. 3 is a plan view showing an embodiment of a touch panel.

DESCRIPTION OF THE PREFERRED EMBODIMENTS

Figure 4:
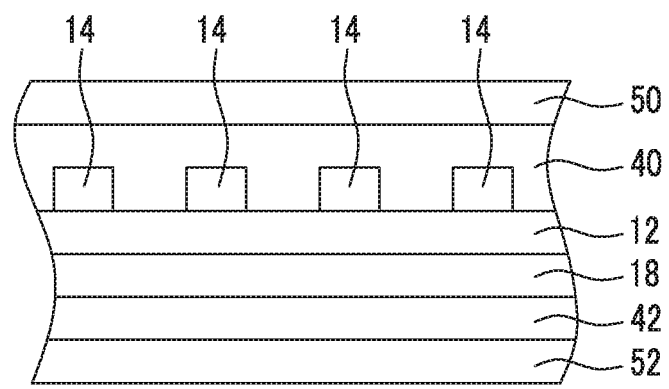
FIG. 4 is a cross-sectional view taken along the cutting line A-A shown in FIG. 3.

Hereinafter, preferred aspects of a layered body for a touch panel of the invention will be described. In this description, the numerical value range expressed using "to" means a range including the numerical values described before and after "to" as a lower limit value and an upper limit value.

First, characteristics will be described in detail in comparison with the related art of the invention.

As described above, a characteristic of the invention is that each of the metal amount in a fine metal wire included in the layered body for a touch panel and the content (amount used) of a benzotriazole-based compound in an adhesive layer is controlled to be within a predetermined range. In general, it is thought that the larger the amount of a migration inhibitor such as a benzotriazole-based compound, the more excellent the migration inhibition ability. However, the inventors have found that when a fine metal wire is further thinned and the metal amount in the fine metal wire is further reduced, disconnection of the fine metal wire easily occurs when the amount of the migration inhibitor used is large. The reason for this will be described in detail as follows.

The migration inhibitor captures metal ions eluted from the fine metal wire, and inhibits the migration. However, when the amount of the migration inhibitor is too large relative to the metal amount in the fine metal wire, the migration inhibitor directly adheres to the metal in the fine metal wire and forms a complex. As a result, the metal in the fine metal wire is actively ionized and eluted, and disconnection of the fine metal wire occurs.

Based on the knowledge, the inventors have found that the migration can be prevented and the occurrence of disconnection of the fine metal wire can be suppressed by adjusting each of the metal amount in the fine metal wire and the amount of the migration inhibitor to be used within a predetermined range.

Next, preferred aspects of the layered body for a touch panel of the invention will be described in detail with reference to the drawings.

FIG. 1 shows a schematic cross-sectional view of an embodiment of the layered body for a touch panel. A layered body 1 for a touch panel includes a substrate 2, fine metal wires 3 disposed on the substrate 2, and an adhesive layer 4 disposed on the fine metal wires 3.

Hereinafter, the members (substrate 2, fine metal wires 3, and adhesive layer 4) will be described in detail.

(Substrate)

The substrate type is not particularly limited as long as the substrate can support the fine metal wires and the adhesive layer to be described later. The substrate is preferably an insulating substrate. More specifically, an organic substrate, a ceramic substrate, a glass substrate, and the like can be used.

In addition, the substrate may have a structure in which at least two selected from the group consisting of an organic substrate, a ceramic substrate, and a glass substrate are laminated.

Examples of the material of the organic substrate include a resin, and for example, a thermosetting resin, a thermoplastic resin, or a mixed resin thereof is preferably used. Examples of the thermosetting resin include a phenol resin, a urea resin, a melamine resin, an alkyd resin, an acrylic resin, an unsaturated polyester resin, a diallyl phthalate resin, an epoxy resin, a silicone resin, a furan resin, a ketone resin, a xylene resin, and a benzocyclobutene resin. Examples of the thermoplastic resin include a polyimide resin, a polyphenylene oxide resin, a polyphenylene sulfide resin, an aramid resin, and a liquid crystal polymer.

As the material of the organic substrate, glass woven fabric, nonwoven glass fabric, aramid fabric, aramid nonwoven fabric, aromatic polyamide woven fabric, materials prepared by impregnating the above materials with the resins, and the like can also be used.

(Fine Metal Wires)

The fine metal wires function as detection electrodes or lead-out wires in a touch panel.

The fine metal wires contain a predetermined metal component, and examples thereof include metals such as gold (Au), silver (Ag), copper (Cu), and aluminum (Al) or alloys thereof, and metal oxides such as indium oxide-tin (ITO), tin oxide, zinc oxide, cadmium oxide, gallium oxide, and titanium oxide.

Among these, the fine metal wires preferably contain silver from the viewpoint of conductive properties. The silver may be contained in the form of a silver alloy, and when the fine metal wires contain a silver alloy, examples of the metal contained other than the silver include tin, palladium, gold, nickel, and chromium.

The fine metal wires are also preferably composed of metal nano-wires made of silver or a silver alloy. The method of manufacturing the metal nano-wires is not particularly limited, and any method may be used for production. However, the metal nano-wires are preferably manufactured by reducing metal ions in a solvent in which a halogen compound and a dispersing agent are dissolved. After the formation of the metal nano-wires, a desalination treatment is preferably performed in the usual manner from the viewpoint of dispersibility and temporal stability of the conductive film.

As the method of manufacturing the metal nano-wires, methods described in JP2009-215594A, JP2009-242880A, JP2009-299162A, JP2010-84173A, JP2010-86714A, JP2009-505358A, and the like can be used.

The amount of the metal contained per unit area of the fine metal wire is in a range of 0.010 g/m$^2$ to 10 g/m$^2$. When the metal amount is within the range, the thickness and the width of the fine metal wire can be reduced, and thus it is possible to respond to a request for high-density integration and to suppress disconnection of the fine metal wire. The metal amount is preferably in a range of 0.012 g/m$^2$ to 8.5 g/m$^2$, and more preferably in a range of 0.015 g/m$^2$ to 7.0 g/m$^2$ in view of more excellent effects of the invention.

When the metal amount is less than 0.010 g/m$^2$, disconnection of the fine metal wire easily occurs, and the electrical resistance of the fine metal wire is greatly changed. When the metal amount is more than 10 g/m$^2$, the frequency of the migration occurrence is high.

In the method of measuring the metal amount, the metal amount in a predetermined volume can be measured by observing a SEM image of a cross-section of the fine metal wire and by performing elemental analysis through fluorescent X-ray analysis.

The "per unit area of the fine metal wire" means per unit area of a contact portion between the fine metal wire and the substrate. That is, the metal amount is calculated based only on the area of the contact portion between the fine metal wire and the substrate. In other words, the area of the substrate surface (for example, a substrate surface which is positioned between the fine metal wires and does not come into contact with the fine metal wires) which does not come into contact with the fine metal wires is not considered in the calculation per unit area of the fine metal wire. Accordingly, the amount of the silver contained per unit area of the fine metal wire means the amount of a metal contained per unit area (m$^2$) in the contact portion between the fine metal wire and the substrate.

The width of the fine metal wire is not particularly limited. The width is preferably in a range of 0.1 μm to 10,000 μm, more preferably in a range of 0.1 μm to 300 μm, even more preferably in a range of 0.1 μm to 100 μm, and particularly preferably in a range of 0.2 μm to 50 μm in view of high integration of the fine metal wires.

The interval between the fine metal wires is not particularly limited, but is preferably in a range of 0.1 μm to 1,000 μm, more preferably in a range of 0.1 μm to 300 μm, even more preferably in a range of 0.1 μm to 100 μm, and particularly preferably in a range of 0.2 μm to 50 μm in view of high integration of the fine metal wires.

The shape of the fine metal wire is not particularly limited, and the fine metal wire may have an arbitrary shape. Examples of the shape include a linear shape, a curved shape, a rectangular shape, and a circular shape. In addition, a plurality of fine metal wires may be disposed in a desired pattern (for example, stripe shape).

The thickness of the fine metal wire is not particularly limited, but is preferably in a range of 0.001 μm to 100 μm, more preferably in a range of 0.01 μm to 30 μm, and even more preferably in a range of 0.01 μm to 20 μm in view of high integration of the fine metal wires.

In FIG. 1, only two fine metal wires are shown, but the number of the fine metal wires is not limited to the aspect of FIG. 1.

A resin binder may be contained in the fine metal wire in such a range that the effects of the invention are not damaged, and if necessary, other components may be further contained. Examples of the resin binder include polysaccharides such as gelatin, carrageenan, polyvinyl alcohol (PVA), polyvinylpyrrolidone (PVP), and starch, cellulose and derivatives thereof, and water-soluble polymers such as polyethylene oxide, polysaccharide, polyvinylamine, chitosan, polylysine, polyacrylic acid, polyalginic acid, polyhyaluronic acid, carboxy cellulose, gum arabic, and sodium alginate.

(Adhesive Layer)

The adhesive layer is disposed on the fine metal wires to cover the fine metal wires, and is used to secure the adhesion to other members.

The adhesive layer contains a benzotriazole-based compound. The benzotriazole-based compound is a compound having a benzotriazole structure that may have a predetermined substituent, and examples thereof include 1H-benzotriazole(1,2,3-benzotriazole), 4-methylbenzotriazole, 5-methylbenzotriazole, benzotriazole-1-methylamine, 4-methylbenzotriazole-1-methylamine, 5-methylbenzotriazole-1-methylamine, N-methylbenzotriazole-1-methylamine, N-ethylbenzotriazole-1-methylamine, N,N-dimethylbenzotriazole-1-methylamine, N,N-diethylbenzotriazole-1-methylamine, N,N-dipropylbenzotriazole-1-methylamine, N,N-dibutylbenzotriazole-1-methylamine, N,N-dihexylbenzotriazole-1-methylamine, N,N-dioctylbenzotriazole-1-methylamine, N,N-bis(2-ethylhexyl)-benzotriazole-1-methylamine, N,N-dimethyl-4-benzotriazole-1-methylamine, N,N-dimethyl-5-benzotriazole-1-methylamine, N,N-diethyl-4-benzotriazole-1-methylamine, N,N-diethyl-5-benzotriazole-1-methylamine, N,N-dipropyl-4-benzotriazole-1-methylamine, N,N-dipropyl-5-benzotriazole-1-methylamine, N,N-dibutyl-4-benzotriazole-1-methylamine, N,N-dibutyl-5-benzotriazole-1-methylamine, N,N-dihexyl-4-benzotriazole-1-methylamine, N,N-dihexyl-5-benzotriazole-1-methylamine, N,N-bis(2-ethylhexyl)-4-methylbenzotriazole-1-methylamine, N,N-bis(2-ethylhexyl)-5-methylbenzotriazole-1-methylamine, N,N-dioleoyl-4-methylbenzotriazole-1-methylamine, N,N-dioleoyl-5-methylbenzotriazole-1-methylamine, N,N-distearyl-4-methylbenzotriazole-1-methylamine, and N,N-distearyl-5-methylbenzotriazole-1-methylamine.

The content of the benzotriazole-based compound in the adhesive layer is in a range of 0.05 mass % to 1.5 mass % with respect to the total mass of the adhesive layer. The content of the benzotriazole-based compound is preferably in a range of 0.1 mass % to 1.0 mass %, more preferably in a range of 0.2 mass % to 0.8 mass %, even more preferably in a range of 0.2 mass % to 0.7 mass %, and particularly preferably not less than 0.2 mass % and less than 0.5 mass % in view of more excellent effects of the invention.

When the content is less than 0.05 mass %, the occurrence of migration cannot be suppressed, and when the content is more than 1.5 mass %, disconnection of the fine metal wire easily occurs, and the electrical resistance of the fine metal wire is greatly changed.

The type of the adhesive contained in the adhesive layer is not particularly limited, but an adhesive substantially not containing a carboxyl group is preferred in view of more excellent effects of the invention. Substantially not containing a carboxyl group means that the content of the carboxyl group in the adhesive is not more than $1 \times 10^{-3}$ mol %, and preferably not more than $1 \times 10^{-4}$ mol %. The lower limit is not particularly limited, but is preferably 0 mol %.

As specific examples of the adhesive, various adhesives such as a rubber-based adhesive, an acrylic adhesive, a silicone-based adhesive, and an urethane-based adhesive can be used, and an acrylic adhesive is preferred.

The acrylic adhesive includes, as a base polymer, an acrylic polymer having a monomer unit of alkyl(meth) acrylate as a main skeleton. The (meth)acrylate is an acrylate and/or methacrylate. The average number of carbon atoms of the alkyl group of the alkyl(meth)acrylate, constituting the main skeleton of the acrylic polymer, is preferably in a range of about 1 to 12, and specific examples of the alkyl(meth)acrylate include methyl(meth)acrylate, ethyl(meth)acrylate, butyl(meth)acrylate, and 2-ethylhexyl(meth) acrylate.

The thickness of the adhesive layer is not particularly limited, but is preferably in a range of 5 μm to 500 μm, and more preferably in a range of 20 μm to 300 μm in view of reducing the thickness of a touch panel.

The adhesive layer is preferably optically transparent. More specifically, the total light transmittance of the adhesive layer is preferably not less than 80%, and more preferably not less than 90%.

<Method of Manufacturing Layered Body for Touch Panel>

The method of manufacturing a layered body for a touch panel is not particularly limited, and a known method can be employed.

First, examples of the method of manufacturing fine metal wires include a subtractive method using an etching treatment, a semi-additive method using electrolytic plating, a method of producing fine metal wires using a silver paste (for example, a paste containing silver nano-particles or silver nano-wires), a vacuum deposition method, a sputtering film formation method, and an ion plating method.

A method using a silver halide can also be suitably exemplified other than the above-described methods. More specifically, a method having a process (1) of forming a silver salt emulsion layer containing a silver halide on a substrate, and a process (2) of forming fine metal wires by performing a developing treatment after exposure of the silver salt emulsion layer can be exemplified.

Hereinafter, the processes will be described.

[Process (1): Silver Salt Emulsion Layer Forming Process]

The process (1) is a process of forming a silver salt emulsion layer on a substrate.

The method of forming a silver salt emulsion layer is not particularly limited. However, in view of productivity, a method of forming a silver salt emulsion layer on a substrate by bringing a composition for forming a silver salt emulsion layer containing a silver halide into contact with the substrate is preferred.

Hereinafter, aspects of the composition for forming a silver salt emulsion layer used in the method will be described in detail, and then the procedures of the processes will be described in detail.

The composition for forming a silver salt emulsion layer contains a silver halide.

The halogen element contained in the silver halide may be any of chlorine, bromine, iodine, and fluorine, or a combination thereof. As the silver halide, for example, a silver halide mainly including a silver chloride, a silver bromide, or a silver iodide is preferably used, and a silver halide mainly including a silver bromide or a silver chloride is more preferably used.

If necessary, a resin binder may be contained in the composition for forming a silver salt emulsion layer. The types of the resin binder are as described above, and among those, gelatin is preferred.

The composition for forming a silver salt emulsion layer contains a solvent, if necessary.

Examples of the solvent to be used include water, organic solvents (for example, alcohols such as methanol, ketones such as acetone, amides such as formamide, sulfoxides such as dimethyl sulfoxide, esters such as ethyl acetate, ethers, and the like), ionic liquids, and mixed solvents thereof.

The content of the solvent to be used is not particularly limited, but is preferably in a range of 30 mass % to 90 mass %, and more preferably in a range of 50 mass % to 80 mass % with respect to the total mass of the silver halide and the resin binder.

(Procedures of Processes)

The method of bringing the composition for forming a silver salt emulsion layer into contact with the substrate is not particularly limited, and a known method can be employed. Examples thereof include a method of applying the composition for forming a silver salt emulsion layer to the substrate, and a method of dipping the substrate in the composition for forming a silver salt emulsion layer.

The content of the silver halide in the silver salt emulsion layer is not particularly limited, but is preferably in a range of 1.0 $g/m^2$ to 20.0 $g/m^2$, and more preferably in a range of 5.0 $g/m^2$ to 15.0 $g/m^2$ in terms of silver in view of more excellent conductive characteristics.

[Process (2): Exposure and Developing Process]

The process (2) is a process of forming fine metal wires by performing an exposure treatment on the silver salt emulsion layer obtained in the process (1), and by performing a developing treatment thereafter.

Hereinafter, the exposure treatment will be described in detail, and then the developing treatment will be described in detail.

(Exposure Treatment)

By performing pattern exposure on the silver salt emulsion layer, the silver halide in the silver salt emulsion layer in the exposure region forms a latent image. In the region in which the latent image is formed, fine metal wires are formed by the developing treatment to be described later. In an unexposed region in which the exposure is not performed, the silver halide is dissolved during a fixing treatment to be described later and flows from the silver salt emulsion layer, and a transparent film is obtained.

The light source used in the exposure is not particularly limited. Light such as visible light or ultraviolet light, or radiation such as X-ray can be exemplified.

The method of performing the pattern exposure is not particularly limited, and for example, may be performed through surface exposure using a photomask or through scanning exposure by laser beams. The shape of the pattern is not particularly limited, and is appropriately adjusted according to a pattern of fine metal wires to be formed.

(Developing Treatment)

The method of the developing treatment is not particularly limited, and a known method can be employed. For example, a usual developing treatment technique which is used for a silver salt photo film, photographic paper, a film for printing plate making, an emulsion mask for a photomask, or the like can be used.

The type of a developer to be used in the developing treatment is not particularly limited. For example, a PQ developer, a MQ developer, a MAA developer, or the like can be used.

The developing treatment may include a fixing treatment which is performed for stabilization by removing the silver salt of the unexposed portion. For the fixing treatment, a fixing treatment technique which is used for a silver salt photo film, photographic paper, a film for printing plate making, an emulsion mask for a photomask, or the like can be used.

The fixing temperature in the fixing process is preferably in a range of about 20° C. to about 50° C., and more preferably in a range of 25° C. to 45° C. The fixing time is preferably in a range of 5 seconds to 1 minute, and more preferably in a range of 7 seconds to 50 seconds.

Next, examples of the method of manufacturing the adhesive layer include a method of forming an adhesive layer by applying a composition for forming an adhesive layer containing an adhesive and a benzotriazole-based compound to a substrate with fine metal wires, and if necessary, by performing a curing treatment, and a method of laminating an adhesive sheet containing an adhesive and a benzotriazole-based compound on a substrate with fine metal wires. The application method is preferred in view of easy adjustment of the thickness of the adhesive layer.

The method of applying the composition for forming an adhesive layer to the substrate with fine metal wires is not particularly limited, and a known method such as a dispensing method, a screen printing method, a curtain coating method, a bar coat method, a spin coater method, an ink jet method, or a dipping method can be employed.

A heating treatment or an exposure treatment may be appropriately performed as the curing treatment.

<Layered Body for Touch Panel>

As described above, the layered body for a touch panel of the invention includes the substrate, the fine metal wires disposed on at least one surface of the substrate, and the adhesive layer.

In the layered body for a touch panel of the invention, the fine metal wires and the adhesive layer may be disposed on at least one surface of the substrate, and as shown in FIG. 2, a layered body 11 for a touch panel in which the above-described fine metal wires 3 and adhesive layer 4 are provided on both surfaces of the substrate 2 may be provided. In FIG. 2, the fine metal wires 3 are disposed in stripes and extend in an X-axis direction on one surface, and are disposed in stripes and extend in a Y-axis direction on the other surface.

Fine metal wires and an adhesive layer other than the above-described fine metal wires and adhesive layer may be provided on the other surface of the substrate.

When the layered body for a touch panel is used for a touch panel, ion migration of the fine metal wire is suppressed, and changes in the electrical resistance of the fine metal wire are suppressed. Accordingly, a touch panel in which malfunction hardly occurs over a long period of time is obtained.

Hereinafter, an aspect of a touch panel using the layered body for a touch panel will be described in detail.

FIGS. 3 and 4 are drawings showing an example of an electrostatic capacitive touch panel using the layered body for a touch panel. FIG. 3 shows a plan view of an electrostatic capacitive touch panel 100. FIG. 4 is a cross-sectional view taken along the cutting line A-A in FIG. 3. FIGS. 3 and 4 schematically show the layer configuration of the touch panel to facilitate understanding thereof, and do not accurately show the arrangement of the layers.

In FIG. 3, the electrostatic capacitive touch panel 100 includes a substrate 12, first detection electrodes 14 disposed on one main surface (on the front surface) of the substrate 12, first lead-out wires 16, a first adhesive layer 40, a first protective substrate 50, second detection electrodes 18 disposed on the other main surface (on the rear surface) of the substrate 12, second lead-out wires 20, a second adhesive layer 42, and a second protective substrate 52. A liquid crystal display device which is disposed on the side of the second protective substrate 52 is omitted in the drawings.

Figure 5:
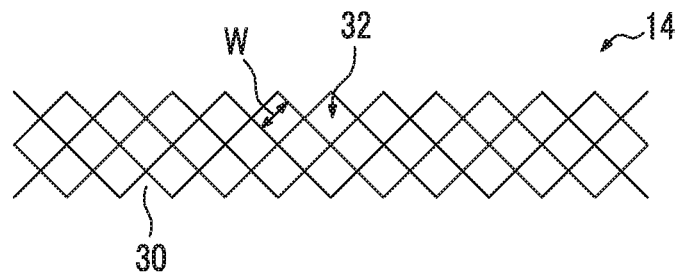
FIG. 5 is an enlarged plan view of a first detection electrode.

FIG. 5 shows an enlarged plan view of a part of the first detection electrode 14. As shown in FIG. 5, the first detection electrode 14 is composed of fine metal wires 30 and include a plurality of lattices 32 formed by the intersecting fine metal wires 30. In other words, the first detection electrode 14 has a mesh pattern composed of the plurality of intersecting fine metal wires 30. Similarly to the first detection electrode 14, the second detection electrode 18 has a mesh pattern composed of a plurality of intersecting fine metal wires 30.

The region in which the first detection electrodes 14 and the second detection electrodes 18 are formed constitutes an input region $E_I$ in which an input operation can be performed by a user, and in an outside region $E_O$ positioned outside of the input region $E_I$, the first lead-out wires 16, the second lead-out wires 20, and a flexible printed wiring board (not shown) are disposed.

The electrostatic capacitive touch panel 100 is formed using the layered body 11 for a touch panel shown in FIG. 2. More specifically, the substrate 2 in the layered body 11 for a touch panel in FIG. 2 corresponds to the substrate 12 in the electrostatic capacitive touch panel 100. The fine metal wires 3 in the layered body 11 for a touch panel correspond to the fine metal wires 30 constituting the first detection electrodes 14 and the second detection electrodes 18, the first lead-out wires 16, and the second lead-out wires 20 in the electrostatic capacitive touch panel 100. The adhesive layer 4 in the layered body 11 for a touch panel corresponds to the first adhesive layer 40 and the second adhesive layer 42 in the electrostatic capacitive touch panel 100.

In FIGS. 3 and 4, the aspect in which the fine metal wires 30 constituting the first detection electrodes 14 and the second detection electrodes 18, the first lead-out wires 16, and the second lead-out wires 20 in the electrostatic capacitive touch panel 100 are composed of the fine metal wires in the layered body for a touch panel has been described, but the invention is not limited to this aspect. For example, an aspect in which only the first lead-out wires 16 and the second lead-out wires 20 in the electrostatic capacitive touch panel 100 are composed of the fine metal wires in the layered body for a touch panel may be provided.

EXAMPLES

Hereinafter, the invention will be described in more detail with examples, but is not limited thereto.

Example A

<Preparation of Sample No. 101>
(Preparation of Silver Halide Emulsion)
To the following Liquid 1 kept at 38° C. and pH 4.5, 90% of the following Liquid 2 and 90% of the following Liquid 3 were added at the same time for over 20 minutes while being stirred together, whereby nuclear particles of 0.16 μm were formed. Next, the following Liquid 4 and Liquid 5 were added thereto for over 8 minutes, and remaining 10% of the following Liquid 2 and 10% of the following Liquid 3 were added thereto for over 2 minutes to increase the particles in size up to 0.21 μm. 0.15 g of potassium iodide was further added thereto, aging was performed for 5 minutes, and the formation of the particles was completed.

| Liquid 1: | |
|---|---|
| Water | 750 ml |
| Gelatin | 9 g |
| Sodium Chloride | 3 g |
| 1,3-dimethylimidazolidine-2-thione | 20 mg |
| Sodium Benzene Thiosulfonate | 10 mg |
| Citric Acid | 0.7 g |
| Liquid 2: | |
| Water | 300 ml |
| Silver Nitrate | 150 g |
| Liquid 3: | |
| Water | 300 ml |
| Sodium Chloride | 38 g |
| Potassium Bromide | 32 g |
| Potassium Hexachloroiridate (III) (0.005% KCl 20% aqueous solution) | 8 ml |
| Ammonium Hexachlorinated Rhodiumate (0.001% NaCl 20% aqueous solution) | 10 ml |
| Liquid 4: | |
| Water | 100 ml |
| Silver Nitrate | 50 g |
| Liquid 5: | |
| Water | 100 ml |
| Sodium Chloride | 13 g |
| Potassium Bromide | 11 g |
| Potassium Ferrocyanide | 5 mg |

Thereafter, washing was performed in the usual manner through a flocculation method. Specifically, the temperature was reduced to 35° C., and the pH was reduced (pH 3.6±0.2) using a sulfuric acid until a silver halide was precipitated. Next, about 3 L of the supernatant liquid was removed (first washing). 3 L of distilled water was added, and then a sulfuric acid was added until a silver halide was precipitated. 3 L of the supernatant liquid was removed again (second washing). The same operation as the second washing was repeated once more (third washing), and thus the washing and desalination process was completed. The pH and the pAg of the emulsion after the washing and desalination were adjusted to 6.4 and 7.5, respectively, and 3.9 g of gelatin, 10 mg of sodium benzene thiosulfonate, 3 mg of sodium benzene thiosulfinate, 15 mg of sodium thiosulfate, and 10 mg of a chloroauric acid were added to perform chemical sensitization so as to obtain optimum sensitivity at 55° C. 100 mg of 1,3,3a,7-tetrazaindene as a stabilizer and 100 mg of Proxel (trade name, manufactured by ICI Co., Ltd.) as a preservative were added thereto. The finally obtained emulsion was a cubic silver iodochlorobromide grain emulsion with an average particle diameter of 0.22 μm and a coefficient of variation of 9% in which 0.08 mol % of silver iodide was contained, the ratio of silver chlorobromide was 70 mol %, and silver bromide was 30 mol %.

(Preparation of Composition for Forming Silver Salt Emulsion Layer)
$1.2 \times 10^{-4}$ mol/molAg of 1,3,3a,7-tetrazaindene, $1.2 \times 10^{-2}$ mol/molAg of hydroquinone, $3.0 \times 10^{-4}$ mol/molAg of a citric acid, and 0.90 g/molAg of 2,4-dichloro-6-hydroxy-1, 3,5-triazine sodium salt were added to the emulsion, and the pH of the coating liquid was adjusted to 5.6 using a citric acid to obtain a composition for forming a silver salt emulsion layer.

(Silver Salt Emulsion Layer Forming Process)

A polyethylene terephthalate (PET) film having a thickness of 100 μm was subjected to a corona discharge treatment, and then a gelatin layer having a thickness of 0.1 μm as an undercoat layer was provided on one surface of the PET film, and an antihalation layer having an optical density of about 1.0 and containing a dye which is decolorized by an alkali of a developer was provided on the undercoat layer. The composition for forming a silver salt emulsion layer was applied to the antihalation layer, and a gelatin layer having a thickness of 0.15 μm was further formed to obtain a PET film having a silver salt emulsion layer formed on one surface thereof. The obtained film was set as a film A. In the formed silver salt emulsion layer, the silver amount was 6.0 g/m$^2$, and the gelatin amount was 1.0 g/m$^2$.

(Exposure and Developing Process)

One surface of the film A was subjected to exposure using parallel light with a high pressure mercury lamp as a light source via a photomask having a comb-like pattern with 50 μm/50 μm lines and spaces (L/S). After the exposure, developing was performed with the following developer, and a fixing liquid (trade name: N3X-R for CN16X, manufactured by Fujifilm Corporation) was further used to perform the developing treatment. Furthermore, rinsing with pure water and drying were performed, and thus a PET film having an electrode pattern composed of fine Ag wires (fine metal wires) and a gelatin layer formed on one surface thereof was obtained. The gelatin layer was formed between the fine Ag wires, and at this time, the Ag amount in a fine Ag wire, obtained through fluorescent X-ray analysis, was 5.4 g/m$^2$. The obtained film with a comb-like wiring pattern was set as a film B.

(Composition of Developer)

The following compounds are contained in 1 liter (L) of the developer.

| | |
|---|---|
| Hydroquinone | 0.037 mol/L |
| N-Methylaminophenol | 0.016 mol/L |
| Sodium Metaborate | 0.140 mol/L |
| Sodium Hydroxide | 0.360 mol/L |
| Sodium Bromide | 0.031 mol/L |
| Potassium Metabisulfite | 0.187 mol/L |

(Sticking Process)

OCA1 (50 micrometers thick) produced as follows and a hard coating film (G1SBF: 50 micrometers thick) manufactured by Kimoto Co., Ltd. were laminated in this order on the surface with wires of the film B obtained in the above description. Furthermore, OCA (#8146-4: 100 micrometers thick) manufactured by 3M Company and non-alkali glass (Corning Eagle XG 700 micrometers thick) were stuck to the other surface (surface having no wires) of the film B to prepare Sample No. 101.

(OCA1 Producing Method)

In a reaction container provided with a stirrer for preparing an acrylic copolymer, a reflux condenser, a thermometer, a dropping funnel, and a nitrogen gas introduction port, 91.5 parts by mass of n-butylacrylate, 0.5 parts by mass of 2-hydroxyethyl acrylate, and 0.2 parts by mass of 2,2'-azobisisobutyro nitrile were dissolved in 100 parts by mass of ethyl acetate, and after nitrogen substitution, polymerization was performed for 8 hours at 80° C. to obtain an acrylic copolymer (1) having a mass average molecular weight of 800,000.

Next, the acrylic copolymer (1) (100 parts by mass on a solid basis) and 1,2,3-benzotriazole (0.45 parts by mass) were diluted with ethyl acetate, and thus an adhesive composition having a resin solid content of 30% was obtained.

0.7 parts by mass of an isocyanate-based crosslinking agent (CORONATE L-45 manufactured by Nippon Polyurethane Industry Co., Ltd., solid content: 45%) was added to 100 parts by mass of the adhesive composition and was stirred for 15 minutes. Then, with this mixture, a PET film having a thickness of 50 μm, in which one surface was subjected to a peeling treatment with a silicone compound, was coated so that the thickness after drying was 25 μm, and drying was performed for 5 minutes at 75° C. The obtained adhesive sheet and the PET film having a thickness of 38 μm, in which one surface was subjected to a peeling treatment with a silicone compound, were stuck together. Thereafter, aging was performed for 5 days at 23° C., and thus OCA1 having a thickness of 25 μm interposed between the PET films was obtained.

The content of the 1,2,3-benzotriazole in the OCA1 was 0.45 mass % with respect to the total mass of the adhesive layer (mass of the solid content of the adhesive layer).

Sample No. 101 (comb-like wires) produced through the above-described method was left for 1 hour at 85° C. and 85% RH, and a DC voltage of 5 V was applied. Thereafter, the state of migration was observed with a microscope, and the resistance of the electrode (fine metal wires) itself was measured. Regarding the resistance of the electrode itself, an initial value R0 and a resistance value after test indicated by R were used to obtain a difference R/R0. The results are shown in Table 1.

The resistance of the electrode was measured using a commercially available tester probe, and an average of three samples was used.

—Evaluation of Migration—

"5": The generation of dendrite and the like cannot be confirmed.

"4": The generation of dendrite and the like is almost not shown.

"3": The generation of dendrite and the like is shown, but there are no problems in practical use.

"2": The generation of dendrite and the like is shown, and there are problems in practical use.

"1": The generation of dendrite and the like is excessively shown, and there are problems in practical use.

—Evaluation of Changes in Electrode Resistance—

"5": R/R0 is more than 0.95 to less than 1.05.

"4": R/R0 is more than 0.90 to 0.95, or is 1.05 to less than 1.10.

"3": R/R0 is more than 0.80 to 0.90, or is 1.10 to less than 1.20.

"2": R/R0 is more than 0.50 to 0.80, or is 1.20 to less than 1.50.

"1": R/R0 is 0.50 or less, or is 1.50 or more.

<Production of Sample No. 102>

Sample No. 102 was produced according to the same procedures as in the production of Sample No. 101, except that the content of the benzotriazole-based compound in the OCA was changed from 0.45 mass % to 0.03 mass %, and various evaluations were performed thereon. The results are shown in Table 1.

<Production of Sample No. 103>

Sample No. 103 was produced according to the same procedures as in the production of Sample No. 101, except that the content of the benzotriazole-based compound in the OCA1 was changed from 0.45 mass % to 0.12 mass %, and various evaluations were performed thereon. The results thereof are shown in Table 1.

<Production of Sample No. 104>

Sample No. 104 was produced according to the same procedures as in the production of Sample No. 101, except that the content of the benzotriazole-based compound in the OCA1 was changed from 0.45 mass % to 1.4 mass %, and various evaluations were performed thereon. The results thereof are shown in Table 1.

<Production of Sample No. 105>

Sample No. 105 was produced according to the same procedures as in the production of Sample No. 101, except that the content of the benzotriazole-based compound in the OCA1 was changed from 0.45 mass % to 1.7 mass %, and various evaluations were performed thereon. The results thereof are shown in Table 1.

<Production of Sample No. 106>

Sample No. 106 was produced according to the same procedures as in the production of Sample No. 101, except that the prescription of the silver salt emulsion layer was changed so that the Ag amount was changed from 5.4 g/m$^2$ to 0.008 g/m$^2$, and various evaluations were performed thereon. The results thereof are shown in Table 1.

<Production of Sample No. 107>

Sample No. 107 was produced according to the same procedures as in the production of Sample No. 101, except that the prescription of the silver salt emulsion layer was changed so that the Ag amount was changed from 5.4 g/m$^2$ to 0.03 g/m$^2$, and various evaluations were performed thereon. The results thereof are shown in Table 1.

<Production of Sample No. 108>

Sample No. 108 was produced according to the same procedures as in the production of Sample No. 101, except that the prescription of the silver salt emulsion layer was changed so that the Ag amount was changed from 5.4 g/m$^2$ to 9.1 g/m$^2$, and various evaluations were performed thereon. The results thereof are shown in Table 1.

<Production of Sample No. 109>

Sample No. 109 was produced according to the same procedures as in the production of Sample No. 101, except that the prescription of the silver salt emulsion layer was changed so that the Ag amount was changed from 5.4 g/m$^2$ to 12 g/m$^2$, and various evaluations were performed thereon. The results thereof are shown in Table 1.

<Production of Sample No. 110>

Sample No. 110 was produced according to the same procedures as in the production of Sample No. 101, except that 1,2,3-benzotriazole in the OCA1 was changed to 4-methylbenzotriazole, and various evaluations were performed thereon. The results thereof are shown in Table 1.

<Production of Sample No. 111>

Sample No. 111 was produced according to the same procedures as in the production of Sample No. 101, except that 1,2,3-benzotriazole in the OCA was changed to tolyltriazole, and various evaluations were performed thereon. The results thereof are shown in Table 1.

<Production of Sample No. 112>

Sample No. 112 was produced according to the same procedures as in the production of Sample No. 101, except that 1,2,3-benzotriazole in the OCA1 was changed to nitrobenzotriazole, and various evaluations were performed thereon. The results thereof are shown in Table 1.

<Production of Sample No. 113>

Sample No. 113 was produced according to the same procedures as in the production of Sample No. 101, except that 1,2,3-benzotriazole in the OCA1 was changed to N-methylbenzotriazole-1-methylamine, and various evaluations were performed thereon. The results thereof are shown in Table 1.

<Production of Sample No. 114>

Sample No. 114 was produced according to the same procedures as in the production of Sample No. 101, except that the OCA1 was changed to the following OCA10, and various evaluations were performed thereon. The results thereof are shown in Table 1.

—Production of OCA10—

In a 1,000 mL three-necked flask, 18.3 parts by mass of isobutyl acrylate, 73.2 parts by mass of 2-ethylhexyl acrylate, 3.6 parts by mass of 2-hydroxyethyl acrylate, 5.0 parts by mass of an acrylic acid, and 100 parts by mass of ethyl acetate were weighed and stirred for 2 hours while a nitrogen gas was introduced thereto. After the oxygen in the polymerization system was sufficiently removed, 0.3 parts by mass of azoisobutyronitrile was added and the temperature was raised to 60° C. Then, the resulting mixture was reacted for 10 hours. After the completion of the reaction, 0.45 parts by mass of 1,2,3-benzotriazole was added to the reaction liquid, and ethyl acetate was added so that the solid content concentration was 30 wt %, whereby an acrylic polymer solution was obtained. The acid value of the obtained acrylic polymer was 40 mgKOH/g, and the weight average molecular weight was 480,000.

Next, 0.019 parts by mass of 1,4-butanediol glycidyl ether was added to 100 parts by mass of the acrylic polymer solution, and stirred for 15 minutes. Using this solution, bar coating was performed under such a condition that the thickness after drying was 50 μm, and drying was performed for 5 minutes at 80° C. to manufacture OCA10. The content of 1,2,3-benzotriazole in the OCA10 was 0.45 mass % with respect to the total mass of the adhesive layer (solid content mass of the adhesive layer).

<Production of Sample No. 115>

Sample No. 115 was produced according to the same procedures as in the production of Sample No. 101, except that an Ag-deposited film produced by depositing Ag onto a PET substrate via a metal mask having a comb-like pattern with 50 μm/50 μm lines and spaces (L/S) was used in place of the film B, and various evaluations were performed thereon. The results thereof are shown in Table 1. The Ag amount obtained through fluorescent X-ray analysis was 0.8 g/m$^2$.

<Production of Sample No. 116>

Sample No. 116 was produced according to the same procedures as in the production of Sample No. 101, except that a film with an Ag paste produced by screen printing the Ag paste (DOTITE FA-401CA, manufactured by Fujikura Kasei Co., Ltd.) on a PET substrate via a screen mask having a comb-like pattern with 50 μm/50 μm lines and spaces (L/S) and by performing baking for 30 minutes at 100° C. was used in place of the film B, and various evaluations were performed thereon. The results thereof are shown in Table 1. The Ag amount obtained through fluorescent X-ray analysis was 9.2 g/m$^2$.

(Production of Silver Nano-Wire Dispersion Liquid)

—Preparation of Silver Nano-Wire Dispersion Liquid (1)—

60 g of a silver nitrate powder was dissolved in 370 g of propylene glycol to prepare a silver nitrate solution 101. 72.0 g of polyvinylpyrrolidone (molecular weight: 55,000) was added to 4.45 kg of propylene glycol, and the temperature was raised to 90° C. while a nitrogen gas is allowed to flow to a gaseous phase portion of a container. This liquid was set as a reaction solution 101. While keeping the flow of the nitrogen gas, 2.50 g of the silver nitrate solution 101 was added to the reaction solution 101 which was being stirred strongly, to perform heating and stirring for 1 minute. To this solution, a solution obtained by dissolving 11.8 g of tetrabutyl ammonium chloride in 100 g of propylene glycol was added, and the resulting mixture was set as a reaction solution 102.

To the reaction solution 102 kept at 90° C. and stirred at a stirring speed of 500 rpm, 200 g of the silver nitrate solution 101 was added at an addition speed of 50 cc/min. The stirring speed was reduced to 100 rpm, and the flow of the nitrogen gas was stopped to perform heating and stirring for 15 hours. To this liquid kept at 90° C. and stirred at a stirring speed of 100 rpm, 220 g of the silver nitrate solution 101 was added at an addition speed of 0.5 cc/min, and heating and stirring was continued for 2 hours after the completion of the addition. The stirring speed was changed to 500 rpm, 1.0 kg of distilled water was added, and then the mixture was cooled to 25° C. to produce a breeding liquid 101.

Using an ultrafiltration module having a molecular weight cutoff of 150,000, ultrafiltration was performed as follows. The addition of a mixed solution (volume ratio of 1 to 1) of distilled water and 1-propanol to the breeding liquid 101 and the condensing of the breeding liquid 101 were repeated until the final conductivity of the filtrate was 50 μS/cm or less. Condensing was performed to obtain a silver nano-wire dispersion liquid (1) having a metal content of 0.45%.

An average minor axis length and an average major axis length of silver nano-wires of the obtained silver nano-wire dispersion liquid (1) were measured. As a result, the average minor axis length was 28.5 nm, and the average major axis length was 15.2 μm. Hereinafter, the "silver nano-wire dispersion liquid (1)" indicates the silver nano-wire dispersion liquid obtained through the above-described method.

—Preparation of Silver Nano-Wire Dispersion Liquid (2)—

The following additive liquids A, B, C, and D were prepared in advance.

[Additive Liquid A]

55 mg of stearyl trimethylammonium chloride, 5.5 g of a stearyl trimethylammonium hydroxide 10% aqueous solution, and 1.8 g of glucose were dissolved in 115.0 g of distilled water to prepare a reaction solution A-1. Furthermore, 65 mg of a silver nitrate powder was dissolved in 1.8 g of distilled water to prepare a silver nitrate aqueous solution A-1. While the reaction solution A-1 was kept at 25° C. and stirred strongly, the silver nitrate aqueous solution A-1 was added thereto. The resulting mixture was strongly stirred for 180 minutes after the addition of the silver nitrate aqueous solution A-1 to prepare an additive liquid A.

[Additive Liquid B]

42.0 g of a silver nitrate powder was dissolved in 958 g of distilled water.

[Additive Liquid C]

75 g of 25% ammonia water was mixed with 925 g of distilled water.

[Additive Liquid D]

400 g of polyvinylpyrrolidone (K30) was dissolved in 1.6 kg of distilled water.

Next, a silver nano-wire dispersion liquid (2) was prepared as follows. 1.30 g of a stearyl trimethylammonium bromide, 33.1 g of a sodium bromide powder, 1,000 g of a glucose powder, and 115.0 g of a nitric acid (1 N) were dissolved in 12.7 kg of distilled water at 80° C. While this liquid was kept at 80° C. and stirred at 500 rpm, the additive liquid A, the additive liquid B, and the additive liquid C were added in sequence at an addition speed of 250 cc/min, 500 cc/min, and 500 cc/min, respectively. The stirring speed was set to 200 rpm and heating was performed at 80° C. After the heating and stirring was continued for 100 minutes with the stirring speed set to 200 rpm, the resulting mixture was cooled to 25° C. The stirring speed was changed to 500 rpm, and the additive liquid D was added at 500 cc/min. This liquid was set as a breeding liquid 201. Next, the breeding liquid 201 was added at once to 1-propanol which was being stirred strongly, so that the mixing ratio was 1 to 1 (volume ratio). The mixture was stirred for 3 minutes to prepare a breeding liquid 202.

Ultrafiltration was performed as follows using an ultrafiltration module having a molecular weight cutoff of 150,000.

The breeding liquid 202 was condensed by 4 times, and then the addition of a mixed solution (volume ratio of 1 to 1) of distilled water and 1-propanol and the condensing were repeated until the final conductivity of the filtrate was 50 μS/cm or less. Condensing was performed to obtain a silver nano-wire dispersion liquid (2) having a metal content of 0.45%.

An average minor axis length and an average major axis length of silver nano-wires of the obtained silver nano-wire dispersion liquid (2) were measured. As a result, the average minor axis length was 17.2 nm, and the average major axis length was 8.8 μm.

(Production of Conductive Film)

A solution of an alkoxide compound having the following composition was stirred for 1 hour at 60° C., and the uniformity thereof was confirmed. The weight average molecular weight (Mw) of the obtained sol-gel solution was measured by GPC (in terms of polystyrene), and Mw was 4,400. 2.24 parts by mass of the sol-gel solution and 17.76 parts by mass of the adjusted silver nano-wire dispersion liquid (1) were mixed and diluted with distilled water and 1-propanol to obtain a silver nano-wire coating liquid (1). The solvent ratio of the obtained coating liquid was 60:40 (distilled water:1-propanol). The silver nano-wire coating liquid (1) was applied to a PET substrate (thickness: 125 μm) through a bar coating method so that the silver amount was 0.015 g/m$^2$ and the total amount of the solid content applied was 0.120 g/m$^2$, and then drying was performed for 1 minute at 120° C. to form a conductive film 1 containing silver nano-wires.

<Solution of Alkoxide Compound>

| | |
|---|---|
| Tetraethoxysilane (KBE-04, manufactured by Shin-Etsu Chemical Co., Ltd.) | 5.0 parts by mass |
| 1% Acetic Acid Aqueous Solution: | 11.0 parts by mass |
| Distilled Water: | 4.0 parts by mass |

(Patterning of Conductive Film)

A photoresist (TMSMR-8900LB: manufactured by Tokyo Ohka Kogyo Co., Ltd.) was applied to the conductive film 1 by spin coating, and was baked for 60 seconds at 90° C. Next, pattern exposure (exposure amount: 12 mW/cm$^2$, 20 seconds) was performed using a photomask, and developing was performed with a developer (NMD-W: manufactured by Tokyo Ohka Kogyo Co., Ltd.). After washing and drying, baking was performed for 60 seconds at 120° C., and thus a patterned photoresist was formed on the conductive film 1.

Next, the photoresist was dipped for 30 seconds in a silver etching liquid (SEA-2: manufactured by Kanto Kagaku), and then washed and dried to etch the silver nano-wires.

Thus, a non-conductive portion was formed in the conductive film 1. Thereafter, the photoresist was peeled off using a neutral peeling liquid (PK-SFR8120: manufactured by Parker Corporation, Inc.), and then washing and drying were performed to produce a conductive film 1 patterned to a comb-like electrode pattern (L/S=50 μm/50 μm).

<Production of Sample No. 117>

Sample No. 117 was produced according to the same procedures as in the production of Sample No. 101, except that the patterned conductive film 1 was used in place of the film B, and various evaluations were performed thereon. The results thereof are shown in Table 1. The Ag amount obtained through fluorescent X-ray analysis was 0.015 g/m$^2$.

<Production of Sample No. 118>

A patterned conductive film 2 was produced according to the above-described procedures, except that the silver nanowire dispersion liquid (1) was changed to the silver nanowire dispersion liquid (2) in the above (Production of Conductive Film).

Next, Sample No. 118 was produced according to the same procedures as in the production of Sample No. 101, except that the patterned conductive film 2 was used in place of the film B, and various evaluations were performed thereon. The results thereof are shown in Table 1. The Ag amount obtained through fluorescent X-ray analysis was 0.015 g/m$^2$.

In addition, it was found that a predetermined effect was not obtained in Sample Nos. 102, 105, 106, and 109 in which the content of the predetermined benzotriazole-based compound or the metal amount was not satisfactory.

Example B

<Preparation of Sample No. 201>

Sample No. 201 (touch panel) was produced according to the same procedures as in the production of Sample No. 101, except that the (silver salt emulsion layer forming process), the (exposure and developing process), and the (sticking process) in the production of Sample No. 101 of Example A were changed to the following procedures.

(Silver Salt Emulsion Layer Forming Process)

A polyethylene terephthalate (PET) film having a thickness of 100 μm was subjected to a corona discharge treatment, and then a gelatin layer having a thickness of 0.1 μm as an undercoat layer was provided on both surfaces of the PET film, and an antihalation layer having an optical density of about 1.0 and containing a dye which is decolorized by an alkali of a developer was provided on the undercoat layer. The composition for forming a silver salt emulsion layer used in Example A was applied to the antihalation layer, and a gelatin layer having a thickness of 0.15 μm was further formed to obtain a PET film having a silver salt emulsion

TABLE 1

| Sample No. | Method | Ag Amount (g/m$^2$) | Benzotriazole-based Compound Type | Content (mass %) | Evaluation Migration | Changes in Electrode Resistance | Remarks |
|---|---|---|---|---|---|---|---|
| 101 | Silver Salt | 5.4 | 1,2,3-Benzotriazole | 0.45 | 5 | 5 | Example |
| 102 | Silver Salt | 5.4 | 1,2,3-Benzotriazole | 0.03 | 1 | 3 | Comparative Example |
| 103 | Silver Salt | 5.4 | 1,2,3-Benzotriazole | 0.12 | 4 | 5 | Example |
| 104 | Silver Salt | 5.4 | 1,2,3-Benzotriazole | 1.4 | 4 | 4 | Example |
| 105 | Silver Salt | 5.4 | 1,2,3-Benzotriazole | 1.7 | 2 | 1 | Comparative Example |
| 106 | Silver Salt | 0.008 | 1,2,3-Benzotriazole | 0.45 | 3 | 1 | Comparative Example |
| 107 | Silver Salt | 0.03 | 1,2,3-Benzotriazole | 0.45 | 4 | 4 | Example |
| 108 | Silver Salt | 9.1 | 1,2,3-Benzotriazole | 0.45 | 4 | 4 | Example |
| 109 | Silver Salt | 12 | 1,2,3-Benzotriazole | 0.45 | 1 | 3 | Comparative Example |
| 110 | Silver Salt | 5.4 | 4-Methylbenzotriazole | 0.45 | 4 | 4 | Example |
| 111 | Silver Salt | 5.4 | Tolyltriazole | 0.45 | 4 | 4 | Example |
| 112 | Silver Salt | 5.4 | Nitrobenzotriazole | 0.45 | 4 | 4 | Example |
| 113 | Silver Salt | 5.4 | N-Methylbenzotriazole-1-methylamine | 0.45 | 4 | 4 | Example |
| 114 | Silver Salt | 5.4 | 1,2,3-Benzotriazole | 0.45 | 3 | 3 | Example |
| 115 | Deposition | 0.8 | 1,2,3-Benzotriazole | 0.45 | 4 | 3 | Example |
| 116 | Ag Paste | 9.2 | 1,2,3-Benzotriazole | 0.45 | 3 | 4 | Example |
| 117 | AgNW | 0.015 | 1,2,4-Benzotriazole | 0.45 | 4 | 3 | Example |
| 118 | AgNW | 0.015 | 1,2,5-Benzotriazole | 0.45 | 4 | 3 | Example |

As shown in Table 1, in the laminated bodies for a touch panel of the invention, the occurrence of migration and changes in the electrical resistance of an electrode were confirmed to be suppressed.

Among these, Sample Nos. 101 and 114 were compared with each other, and thus it was confirmed that Sample No. 101 in which the adhesive did not contain a carboxyl group obtains a more excellent effect.

In addition, Sample No. 101 and Sample Nos. 110 to 114 were compared with each other, and thus it was confirmed that a more excellent effect is obtained when using 1,2,3-benzotriazole as the benzotriazole-based compound.

layer formed on both surfaces thereof. The obtained film was set as a film C. In the formed silver salt emulsion layer, the silver amount was 6.0 g/m$^2$, and the gelatin amount was 1.0 g/m$^2$ in each layer.

(Exposure and Developing Process)

Both surfaces of the film C were subjected to exposure using parallel light with a high pressure mercury lamp as a light source via a photomask (hereinafter, photomask X) having detection electrodes (first detection electrode and second detection electrode) and lead-out wiring portions (first lead-out wire and second lead-out wire) as shown in FIG. 3. After the exposure, developing was performed with the developer used in Example A, and a fixing liquid (trade name: N3X-R for CN16X, manufactured by Fujifilm Corporation) was further used to perform the developing treatment. Furthermore, rinsing with pure water and drying were performed, and thus a PET film having an electrode pattern composed of fine Ag wires (fine metal wires) and a gelatin layer formed on both surfaces thereof was obtained. The gelatin layer was formed between the fine Ag wires, and at this time, the Ag amount in a fine Ag wire, obtained through fluorescent X-ray analysis, was 5.4 g/m². The obtained film with a wiring pattern was set as a film D.

The first detection electrode disposed on the PET film was an electrode extending in the X-direction, and the second detection electrode is an electrode extending in the Y-direction. The number of the X-detection electrodes (length: 60 mm) was 15, and the number of the Y-detection electrodes (length: 90 mm) was 10.

(Sticking Process)

The OCA1 (50 micrometers thick) produced in the above description was stuck to both surfaces of the film D obtained in the above description. The appearance of the obtained layered body was shaped into the same size as substantially sensor-sized soda lime glass having a thickness of 0.7 mm, and a flexible printed wiring board (FPC) was pressed and bonded thereto with ACF (CP906AM-25AC) manufactured by Sony Chemicals Corporation. Then, the soda lime glass was stuck to the top side, and a liquid crystal display was stuck to the bottom side to manufacture Sample No. 201 (touch panel).

<Production of Sample No. 202>

Sample No. 202 was produced according to the same procedures as in the production of Sample No. 201, except that the content of the benzotriazole-based compound in the OCA1 was changed from 0.45 mass % to 0.03 mass %.

<Production of Sample No. 203>

Sample No. 203 was produced according to the same procedures as in the production of Sample No. 201, except that the content of the benzotriazole-based compound in the OCA1 was changed from 0.45 mass % to 0.12 mass %.

<Production of Sample No. 204>

Sample No. 204 was produced according to the same procedures as in the production of Sample No. 201, except that the content of the benzotriazole-based compound in the OCA1 was changed from 0.45 mass % to 1.4 mass %.

<Production of Sample No. 205>

Sample No. 205 was produced according to the same procedures as in the production of Sample No. 201, except that the content of the benzotriazole-based compound in the OCA1 was changed from 0.45 mass % to 1.7 mass %.

<Production of Sample No. 206>

Sample No. 206 was produced according to the same procedures as in the production of Sample No. 201, except that the prescription of the silver salt emulsion layer was changed so that the Ag amount was changed from 5.4 g/m² to 0.008 g/m².

<Production of Sample No. 207>

Sample No. 207 was produced according to the same procedures as in the production of Sample No. 201, except that the prescription of the silver salt emulsion layer was changed so that the Ag amount was changed from 5.4 g/m² to 0.03 g/m².

<Production of Sample No. 208>

Sample No. 208 was produced according to the same procedures as in the production of Sample No. 201, except that the prescription of the silver salt emulsion layer was changed so that the Ag amount was changed from 5.4 g/m² to 9.1 g/m².

<Production of Sample No. 209>

Sample No. 209 was produced according to the same procedures as in the production of Sample No. 201, except that the prescription of the silver salt emulsion layer was changed so that the Ag amount was changed from 5.4 g/m² to 12 g/m².

<Production of Sample No. 210>

Sample No. 210 was produced according to the same procedures as in the production of Sample No. 201, except that 1,2,3-benzotriazole in the OCA1 was changed to 4-methylbenzotriazole.

<Production of Sample No. 211>

Sample No. 211 was produced according to the same procedures as in the production of Sample No. 201, except that 1,2,3-benzotriazole in the OCA1 was changed to tolyltriazole.

<Production of Sample No. 212>

Sample No. 212 was produced according to the same procedures as in the production of Sample No. 201, except that 1,2,3-benzotriazole in the OCA1 was changed to nitrobenzotriazole.

<Production of Sample No. 213>

Sample No. 213 was produced according to the same procedures as in the production of Sample No. 201, except that 1,2,3-benzotriazole in the OCA1 was changed to N-methylbenzotriazole-1-methylamine.

<Production of Sample No. 214>

Sample No. 214 was produced according to the same procedures as in the production of Sample No. 201, except that the OCA1 was changed to the above-described OCA10.

<Production of Sample No. 215>

Sample No. 215 was produced according to the same procedures as in the production of Sample No. 201, except that an Ag-deposited film produced by depositing Ag onto both surfaces of a PET substrate via the photomask X was used in place of the film D. The Ag amount obtained through fluorescent X-ray analysis was 0.8 g/m².

<Production of Sample No. 216>

Sample No. 216 was produced according to the same procedures as in the production of Sample No. 201, except that a film with an Ag paste produced by screen printing the Ag paste (DOTITE FA-401CA, manufactured by Fujikura Kasei Co., Ltd.) on both surfaces of a PET substrate via the photomask X and by performing baking for 30 minutes at 100° C. was used in place of the film D. The Ag amount obtained through fluorescent X-ray analysis was 9.2 g/m².

Sample Nos. 201 to 216 produced through the above-described method were continuously driven for 100 hours under the environment of 60° C. and 90% RH, and then their operations were confirmed. In Sample Nos. 201, 203, 204, 207, 208, and 210 to 216 which were the touch panels using the layered body for a touch panel of the invention, operation failure was not confirmed. In Sample Nos. 202, 205, 206, and 209 of comparative examples which were the touch panels using a layered body that was not the layered body for a touch panel of the invention, operation failure resulting from the occurrence of migration or an increase in the resistance of the fine metal wires was confirmed.

Example C

Sample No. 301 (touch panel) was produced according to the same procedures as in the production of Sample No. 201, except that a film E in which the first detection electrode and the second detection electrode in the film D used in Example B were formed of ITO thin films was used in place of the film D. The lead-out wiring portions (first lead-out wire and second lead-out wire) connected to the first detection electrode and the second detection electrode in the film E are composed of fine Ag wires as in the film D.

The obtained Sample No. 301 was continuously driven for 100 hours under the environment of 60° C. and 90% RH, and then its operation was confirmed. There was no corrosion of ITO constituting the first detection electrode and the second detection electrode, and it was confirmed that Sample No. 301 was operated well.

When an adhesive layer containing an adhesive having a carboxylic acid and having a benzotriazole content of more than 1.5 mass % was used in place of the OCA1, the corrosion of ITO was confirmed, and operation failure resulting from the occurrence of migration or an increase in the resistance of the fine metal wires was confirmed.

EXPLANATION OF REFERENCES

1: layered body for touch panel
2, 12: substrate
3, 30: fine metal wire
4: adhesive layer
14: first detection electrode
16: first lead-out wire
18: second detection electrode
20: second lead-out wire
22: fine metal wire
32: lattice
40: first adhesive layer
42: second adhesive layer
50: first protective substrate
52: second protective substrate
100: touch panel

What is claimed is:

1. A layered body for a touch panel, comprising:
a substrate;
fine metal wires which are disposed on the substrate; and
an adhesive layer which is disposed on the fine metal wires, wherein
the amount of the metal contained per unit area of only a contact portion between the fine metal wire and the substrate is in a range of 0.010 g/m$^2$ to 7.0 g/m$^2$, and
the adhesive layer contains a benzotriazole-based compound, and the content of the benzotriazole-based compound is in a range of 0.05 mass % to 1.5 mass % with respect to the total mass of the adhesive layer.

2. The layered body for a touch panel according to claim 1,
wherein the adhesive contained in the adhesive layer does not substantially contain a carboxyl group.

3. The layered body for a touch panel according to claim 1,
wherein the benzotriazole-based compound includes 1,2,3-benzotriazole.

4. The layered body for a touch panel according to claim 1,
wherein the fine metal wires are fine metal wires obtained by performing an exposure treatment on a silver halide-containing silver salt emulsion layer disposed on the substrate, and by performing a developing treatment thereafter.

5. A touch panel comprising:
the layered body for a touch panel according to claim 1.

6. The layered body for a touch panel according to claim 2,
wherein the benzotriazole-based compound includes 1,2,3-benzotriazole.

7. The layered body for a touch panel according to claim 2,
wherein the fine metal wires are fine metal wires obtained by performing an exposure treatment on a silver halide-containing silver salt emulsion layer disposed on the substrate, and by performing a developing treatment thereafter.

8. The layered body for a touch panel according to claim 3,
wherein the fine metal wires are fine metal wires obtained by performing an exposure treatment on a silver halide-containing silver salt emulsion layer disposed on the substrate, and by performing a developing treatment thereafter.

9. A touch panel comprising:
the layered body for a touch panel according to claim 2.

10. A touch panel comprising:
the layered body for a touch panel according to claim 3.

11. A touch panel comprising:
the layered body for a touch panel according to claim 4.

* * * * *